US006329310B1

(12) United States Patent
Peuchert et al.

(10) Patent No.: US 6,329,310 B1
(45) Date of Patent: Dec. 11, 2001

(54) ALKALI-FREE ALUMINOBOROSILICATE GLASS AND USES THEREOF

(75) Inventors: Ulrich Peuchert; Peter Brix, both of Mainz (DE)

(73) Assignee: Schott Glas (DE)

( * ) Notice: Subject to any disclaimer, the term of this patent is extended or adjusted under 35 U.S.C. 154(b) by 0 days.

(21) Appl. No.: 09/548,302

(22) Filed: Apr. 12, 2000

(30) Foreign Application Priority Data

Apr. 12, 1999 (DE) ................................................ 199 16 296

(51) Int. Cl.[7] ............................. C03C 3/091; C03C 3/093
(52) U.S. Cl. ................................. 501/66; 501/64; 501/67; 501/69; 501/70
(58) Field of Search .................................... 501/64, 66, 67, 501/69, 70

(56) References Cited

U.S. PATENT DOCUMENTS

| 5,770,535 | * | 6/1998 | Brix et al. ......................... 501/67 |
| 6,096,670 | * | 8/2000 | Lautenschlager et al. ............ 501/67 |
| 6,169,047 | * | 1/2001 | Nishizawa et al. .................... 501/66 |

FOREIGN PATENT DOCUMENTS

| 196 01 922 A 1 | | 7/1997 | (DE) . |
| 19739912 | * | 12/1998 | (DE) . |
| 19939789 | * | 2/2001 | (DE) . |
| 0 901 990 A 1 | | 3/1999 | (EP) . |
| 10-45422 | | 2/1998 | (JP) . |
| 10-59741 | | 3/1998 | (JP) . |
| 10 114538 | | 5/1998 | (JP) . |
| 2044709 | * | 9/1995 | (RU) . |
| 98/27019 | | 6/1998 | (WO) . |

OTHER PUBLICATIONS

Patent Abstract only of Japan 10114538, May 6, 1998.
Patent Abstract only of Japan 10059741, Mar. 3, 1998.
Patent Abstract only of Japan 10045422, Feb. 17, 1998.

* cited by examiner

*Primary Examiner*—Karl Group
(74) *Attorney, Agent, or Firm*—Millen, White, Zelano & Branigan, P.C.

(57) ABSTRACT

The invention relates to an alkali-free aluminoborosilicate glass which has the following composition in % by weight, based on oxide: $SiO_2$ 60.5–69, $B_2O_3$ 0.5–4.5, $Al_2O_3$ 15–24, MgO 3–10, CaO 0–10, SrO 0.5–8, BaO 0.5–5.5, with MgO+CaO+SrO+BaO 8–19, $SnO_2$ 0.1–2, $ZrO_2$ 0–2, $TiO_2$ 0–2, $CeO_2$ 0–1, ZnO 0–<1, and which is highly suitable for use as substrate glass both in display technology and thin-film photovoltaics.

15 Claims, No Drawings

ALKALI-FREE ALUMINOBOROSILICATE GLASS AND USES THEREOF

FIELD OF THE INVENTION

The invention relates to an alkali-free aluminoborosilicate glass. The invention also relates to uses of this glass.

BACKGROUND OF THE INVENTION

High requirements are made of glasses for applications as substrates in liquid-crystal flat-panel display technology, for example in TN (twisted nematic)/STN (supertwisted nematic) displays, active matrix liquid crystal displays (AMLCDs), thin film transistors (TFTs) or plasma addressed liquid crystals (PALCs). Besides high thermal shock resistance and good resistance to the aggressive chemicals employed in the production process for flat-panel screens, the glasses should have high transparency over a broad spectral range (VIS, UV) and low density in order to save weight. Use as substrate material for integrated semiconductor circuits, for example in TFT displays ("chip on glass") in addition requires thermal matching to the thin-film material a- or polysilicon ($\alpha_{20/300}=3.7\times10^{-6}$/K) and the absence of alkali metal ions. Sodium oxide amounts resulting from production of more than 1500 ppm cannot be tolerated in view of the generally "poisoning" action due to diffusion of $Na^+$ into the semiconductor layer.

It should be possible to produce suitable glasses economically on a large industrial scale in adequate quality (no bubbles, knots, inclusions), for example in a float plant or by the drawing method. In particular, the production of thin. (<1 mm) streak-free substrates with low surface undulation by the drawing process requires high devitrification stability of the glasses. Compaction of the substrate during production, which has a disadvantageous effect on the semiconductor microstructure, can be countered by setting a suitable temperature-dependent viscosity characteristic line of the glass: with respect to thermal process and shape stability, it should have a high strain point (SP; temperature at a viscosity of $10^{14.7}$ dPas), ideally above 700° C., or a high glass transition temperature $T_g$, i.e. $T_g>720°$ C., while on the other hand not having excessively high melting and working ($V_A$) points, i.e. a $V_A$ of $\leq 1330°$ C. Furthermore, a low density of the glasses is desired in order to keep the overall weight of the display low, in particular in the case of large screen formats.

The requirements of glass substrates for liquid crystal display (LCD) technology are also described in "Glass substrates for AMLCD applications: properties and implications" by J C Lapp, SPIE Proceedings, Vol. 3014, Invited paper (1997).

In principle, corresponding requirements are made of glasses for substrates in thin-film photovoltaics, especially based on microcrystalline silicon ($\mu$c-Si).

An essential prerequisite for the commercial success of thin-film photovoltaics against high-cost solar technology based on crystalline Si wafers is the presence of inexpensive high-temperature-resistant substrates.

At present, two different coating methods are known for the production of $\mu$c-Si solar cells. A process which has proven particularly favorable with respect to high deposition rates is a high-temperature chemical vapor deposition (CVD) process using inexpensive trichlorosilane as Si source. This process requires the heating of a suitable substrate to 1000° C. or above. The only suitable substrates are then comparatively expensive ceramics, graphite, silicon or similar materials. Use of transparent glass-ceramics has also been discussed in the literature (L. R. Pinckney: "Transparent, High Strain Point Glass-Ceramics", Proc. 18th Intern. Conf. Glass, San Francisco; Amer. Ceram. Soc., Ohio, 1998, and L. R. Pinckney, G. H. Beall: "Nanocrystalline Non-Alkali Glass-Ceramics", J. NonCryst. Solids 219 (1997)). Efficiencies achieved on small areas by the high temperature CVD process are currently about 11%.

As an alternative to the high-temperature approach, low temperature Si deposition processes have been developed which allow the use of the less expensive substrate material glass. One possibility here is the deposition of amorphous silicon at low temperatures of up to 300° C. and, in a subsequent step, the recrystallization of the layers using laser or zone-melting methods. In order to prevent deformation of the glass plate at the temperatures prevailing in the conditioning process, a special glass with very high heat resistance which is matched thermally to silicon is required. These glasses suitably have a glass transition temperature, Tof at least 750° C. As a consequence of the tendency to change over from a-Si to poly-Si coatings, the highest possible heat resistance of the substrate is also desired for substrates for TFT display technology.

The current development of $\mu$c-Si technology is moving in the direction of a substrate concept, i.e. the substrate material forms the basis of the solar cells and is opaque to the incident light. However, a development towards a less expensive superstrate arrangement (light passes through the substrate material, no cover glass necessary) is not excluded. In order to achieve high efficiencies, high transparency of the glass in the VIS/UV is then necessary, which means that the use of semi-transparent glass-ceramics, besides the above-mentioned cost reasons, proves to be disadvantageous.

The said requirement profile is satisfied most closely by alkaline earth metal aluminoborosilicate glasses. However, the known display or solar-cell substrate glasses described in the following specifications still have disadvantages and do not meet the entire range of requirements.

Numerous specifications describe glasses having relatively high $B_2O_3$ contents, for example DE 196 01 922 A, JP 58-120 535 A, JP 60-141 642 A, JP 8-295 530 A, JP 9-169 538 A, JP 10-59 741 A, JP 10-722 37 A, EP 714 862 A1, EP 341 313 B1, and U.S. Pat. No. 5,374,595. These glasses do not have the requisite high glass transition temperatures or strain points.

The same applies to the low-$SiO_2$ glasses of JP 61-132 536 A and to the glasses of DE 197 39 912 Cl containing a maximum of 60% by weight of $SiO_2$ and at least 6.5% by weight of $B_2O_3$.

By contrast, $B_2O_3$-free glasses are described in U.S. Pat. No. 4,607,016, JP 1-126 239 A, JP 61-236 631 A and JP 61-261 232 A. Owing to the freedom from $B_2O_3$, the glasses have poor melting properties and tend toward devitrification. The glasses mentioned in WO 97/30001 likewise contain no $B_2O_3$.

DE 44 30 710 Cl describes borosilicate glasses having low boric acid contents and high $SiO_2$ contents (>75% by weight), which results in them having high viscosity even at high temperatures and means that they can only be melted and fined at high cost. In addition, these glasses, having glass transition temperatures $T_g$ of from 500 to 600° C., have only relatively low heat resistance.

DE 196 17 344 Cl and DE 196 03 698 Cl by the Applicant disclose alkali-free, tin-containing glasses having a coefficient of thermal expansion $\alpha_{20/300}$ of about 3.7·10⁻⁶/K and very good chemicals resistance. They are suitable for use in display technology. However, since they necessarily contain at least 1 or 2% by weight of the network modifier ZnO, they are not totally suitable, in particular for processing in a float plant.

Thus, the glasses of JP 61-295 256 A, which contain Pb and have a relatively high Zn content (≧3.5% by weight) are likewise not very suitable for the float process, since coatings of ZnO and PbO or Pb can easily form on the glass surface in the reducing forming gas atmosphere due to evaporation and subsequent condensation at an excessively high concentration.

JP 3-164 445 A describes glass-ceramics having ZnO contents of ≧5% by weight for displays and solar cells. They have the desired high glass transition temperatures, but are poorly matched to μc-Si with their thermal expansion of greater than 4.0·10⁻⁶/K.

Further glass-ceramics which have a relatively high Zn content (≧8% by weight) and in addition contain Pb are described in JP 1-208 343 A. These likewise have excessively high thermal expansion. Correspondingly, EP 168 189 A2 describes glass-ceramics containing ≧2% by weight of ZnO.

MgO-free glasses having high BaO and low $Al_2O_3$ contents are described in DE 37 30 410 A1. The stated strain points are too low, and the density of the glasses will be disadvantageously high. The PCT applications WO 97/11919 and WO 97/11920 also describe alkali-free, MgO-free or low-MgO glass substrates.

The glasses of U.S. Pat. No. 5,116,788 have high contents of alkaline earth metal oxides with from 23 to 28 mol-% of RO, which means that they have excessively high thermal expansion for Si. The same applies to the alkali-free, high-temperature-resistant glasses which are used as lamp bulb glasses for halogen lamps. They are matched to Mo with respect to their thermal expansion. Examples which may be mentioned here are the glasses in the specifications U.S. Pat. No. 4,060,423(BaO 6–16% by weight), U.S. Pat. No. 3,978, 362 (CaO 14–21% by weight) and EP 261 819 A1 (CaO 10.5–12.5% by weight; BaO 8.5–14% by weight).

EP 672 629 A2 and U.S. Pat. No. 5,508,237 describe aluminosilicate glasses for flat-panel displays. They have various composition ranges with various coefficients of thermal expansion. It is claimed that these glasses can be processed not only by the overflow fusion drawing process, but also by other processes for the production of flat glass. However, the glasses, in particular, which have a coefficient of thermal expansion which is matched to polycrystalline Si have very high working points $V_A$, which make them unsuitable for the float process. As in the glasses described hitherto, the visual quality here is again not high, since no method for effective, in particular float-compatible fining is indicated. The fining agents $Sb_2O_3$ and $As_2O_3$ mentioned by way of example are unsuitable for the float process owing to their ease of reduction. The same applies to the optional glass components $Ta_2O_5$ and $Nb_2O_5$.

The specification JP 9-123 33 A, which relates to glasses for hard disks, describes compositions of $Si_2$, $Al_2O_3$, CaO and further optional components. The glasses listed have high alkaline earth metal contents and thus have high thermal expansion, which makes them unsuitable for use in LCD and PV technology. Their visual quality will probably also be inadequate.

The latter also applies to the relatively $B_2O_3$-rich glasses of JP 9-486 32 A, JP 9-156 953 A and WO 98/27019, in particular as no method for effective fining is indicated.

JP 9-263 421 A and JP 10-454 22 A describe alkali-free glasses which can be processed by the float method for use as substrates in flat-panel display systems. The glasses listed have very high working points and very high temperatures at a viscosity of $10^2$ dPas, which impairs their melting properties and makes inexpensive production impossible, since the requisite temperature range also means that very high requirements are made of the tank and distributor material with respect to corrosion resistance. The glasses of JP 10-454 22 A are free from $TiO_2$, $ZrO_2$ and $CeO_2$. The density of the BaO-containing glasses is relatively high at p>2.6 g/cm³. The glasses of JP 9-263 421 A preferably contain no BaO and are free from $TiO_2$, $ZrO_2$, $CeO_2$ and $SnO_2$.

SUMMARY OF THE INVENTION

It is a feature of the invention to provide glasses which satisfy the said physical and chemical requirements of glass substrates for liquid-crystal displays, in particular for TFT displays, and for thin-film solar cells, in particular based on μc-Si, glasses which have high heat resistance, a process favorable processing range and high devitrification stability.

The feature is achieved by an aluminoborosilicate glass as defined by an alkali-free aluminoborosilicate glass comprising the following composition in % by weight, based on oxide: $SiO_2$ 60.5–69, $B_2O_3$ 0.5–4.5, $Al_2O_3$ 15–24, MgO 3–10, CaO 0–10, SrO 0.5–8, BaO 0.5–5.5, with MgO+CaO+SrO+BaO 8–19, $SnO_2$ 0.1–2, $ZrO_2$ 0–2, TiO2 0–2, $CeO_2$ 0–1 and ZnO 0<1.

The glass contains a high proportion of the network-forming components, $SiO_2$ and $Al_2O_3$ at the same time as only low proportions of $B_2O_3$.

The glass contains from 60.5 to 69% by weight of $SiO_2$. At a lower content, the chemical resistance is impaired, while at a higher content, the thermal expansion is too low and the crystallization tendency of the glass increases. Preference is given to a content of up to 68% by weight, particularly preferably up to 66% by weight of The glass contains from 15 to 24% by weight of $Al_2O_3$. At a lower content, the crystallization susceptibility of the glass increases. A higher content has a disadvantageous effect on the process temperatures during hot shaping, since the working point $V_A$ would be greatly increased. Preference is given to a content of at least 16% by weight of $Al_2O_3$, particularly preferably at least 16.5% by weight of $Al_2O_3$. The maximum content is preferably 23% by weight, particularly preferably <22.5% by weight of $Al_2O_3$.

The $B_2O_3$ content is restricted to a maximum of 4.5% by weight in order to achieve a high glass transition temperature Tg. The $B_2O_3$ content is preferably less than 4.0% by weight. A further restriction in the content to at most 3.5% by weight, in particular to less than 3.0% by weight of $B_2O_3$, is preferred.

Complete omission of $B_2O_3$ is not possible, but even small proportions, namely at least 0.5% by weight, are sufficient crucially to improve the melt flux and the crystallization stability. Owing to the low $B_2O_3$ contents, the glass has very high acid resistance.

Essential glass constituents are the alkaline earth metal oxides. In order to achieve a coefficient of thermal expansion $\alpha_{20/300}$ of from 2.8·10⁻⁶/k to 4.0·10⁻⁶/K, the sum of MgO, CaO, SrO and BaO should be from 8 to 19% by weight, particularly preferably from 8 to 18% by weight.

The individual oxides are present in a balanced ratio to one another. Thus, the glass contains from 3 to 10% by weight, preferably up to 9% by weight, particularly preferably up to 8.5% by weight, of MgO and from 0.5 to 8% by weight preferably up to 7% by weight, particularly preferably from 1.5 to 6.5% by weight, of SrO and from 0.5 to 5.5% by weight, particularly preferably up to 4.5% by weight, of BaO. The glass may furthermore contain up to 10% by weight of CaO. The presence of all four alkaline earth metal oxides is preferred since this increases the devitrification stability of the glass and since the individual oxides each have advantageous effects on different properties of the glass. The glass therefore preferably also contains at least 0.5% by weight, preferably from 1 to 9% by weight, particularly preferably from 2 to 8.5% by weight, of CaO.

Rather high proportions of MgO and CaO have a positive effect on the desired properties of low density and low working point, while a relatively high content of BaO favors the crystallization stability. In respect of the desired low density, SrO is preferred over BaO and is a component which is almost as effective as BaO in respect of crystallization stability.

The glass can contain up to 2% by weight, preferably up to 1% by weight, of $ZrO_2$. $ZrO_2$ increases the heat resistance of the glass. At contents of greater than 2% by weight, however, melt relicts can occur in the glass owing to the low solubility of $ZrO_2$. $ZrO_2$ is preferably present in an amount of at least 0.1% by weight.

The glass can contain up to 2% by weight, preferably up to 1% by weight, particularly preferably up to 0.5% by weight, of $TiO_2$. $TiO_2$ reduces the solarization tendency of the glasses. At contents of greater than 2% by weight, color casts can occur due to complex formation with $Fe^{3+}$ ions. $TiO_2$ is preferably present, in an amount of at least 0.1% by weight.

The glass can contain up to <1% by weight of ZnO. ZnO, as a network modifier, has a structure-loosening function and has less effect on the thermal expansion than the alkaline earth metal oxides. In particular, in the case of processing of the glass by the float process, ZnO is preferably omitted.

The glass is alkali-free. The term "alkali-free" here is taken to mean that it is essentially free from alkali metal oxides, although it can contain impurities of less than 1500 ppm. However, impurities of less than 1000 ppm arc preferred.

The glass contains from 0.1 to 2% by weight of $SnO_2$. Preferably, the minimum content of $SnO_2$ is 0.2% by weight. $SnO_2$ is a highly effective fining agent in the high-melting alkali-free glass system. Tin oxide is employed a $SnO_2$, and its tetravalent state is stabilized by addition of other oxides, such as, for example, $TiO_2$, or by addition of nitrates. The $SnO_2$ content is restricted to the said upper limit owing to its low solubility at temperatures below the working point $V_A$. In this way, deposition of microcrystalline Sn-containing phases is avoided. Preference is given to a content of at most 1% by weight, particularly preferably a content of at most 0.7% by weight.

The glass may in addition contain up to 1% by weight of $CeO_2$. Preference is given to a $CeO_2$ content of at least 0.1% by weight. The combination of $SnO_2$ with $CeO_2$ stabilizes the $SnO_2/SnO$ redox and reinforces the very good fining action of the $SnO_2$. The $CeO_2$ content is preferably restricted to at most 0.5% by weight.

Because, inter cilia, the fining agents $As_2O_3$ and $Sb_2O_3$ can thus be omitted and the glasses, apart from unavoidable impurities, are both free from these components and also substantially free from other readily reducible constituents, these glasses can be processed not only by various drawing processes, but also by the float process. If it is not intended to use the last-mentioned process, the glass may contain up to 1.5% by weight of $As_2O_3$ and/or $Sb_2O_3$ as additional fining agent(s). Irrespective of the processing method, the addition of 1.5% by weight of each of $Cl^-$ (for example as $BaCl_2$), $F^-$ (for example as $CaF_2$) or $SO_4^{2-}$ (for example as $BaSO_4$) is also possible. However, the sum of $As_2O_3$, $Sb_2O_3$, $Cl^-$, $F^-$ and $SO_4^{2-}$ should not exceed 1.5% by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure[s] of all applications, patents and publications, cited above or below, and of corresponding German application No. 19916296.4-45, filed Apr. 12, 1999 is hereby incorporated by reference.

WORKING EXAMPLES

Glasses were produced in Pt/Ir crucibles at 1620° C. from conventional raw materials which were essentially alkali-free apart from unavoidable impurities. The melt was fined at this temperature for one and a half hours, then transferred into inductively heated platinum crucibles and stirred at 1550° C. for 30 minutes for homogenization.

The Table shows six examples of glasses according to the invention with their compositions (in % by weight, based on oxide) and their major properties. The following properties are given:

The density $\rho$ [g/cm$^3$]

The coefficient of thermal expansion $\alpha_{20/300}$ [$10^{-6}$/K]

The dilatometric glass transition temperature $T_g$ [° C.] in accordance with DIN 52324

The temperature at a viscosity of $10^4$ dPas (referred to as T4 [° C.])

The temperature at a viscosity of $10^{13}$ dPas (referred to as T13 [° C.]), measured in accordance with DIN 52312, Part 4

The temperature at a viscosity of about $10^{13.2}$ dPas, i.e. the annealing point AP [° C.]), measured in accordance with DIN 52312, Part 7 (ISO 7884-7)

The temperature at a viscosity of $10^{14.7}$ dPas, i.e. the strain point SP [° C.], calculated from the AP values The upper devitrification limit UDL [° C.]I , i.e. the liquidus temperature The maximum crystal growth rate $V_{max}$ [$\mu$m/h]

The hydrolytic resistance in accordance with ISO 719 "H" [$\mu$g of $Na_2O$/g]. At a base equivalent as $Na_2O$ per g of glass powder of $\leq 31$ $\mu$g/g, the glasses belong to hydrolytic class 1("highly chemically resistant glass")

An acid resistance as weight loss (material removal value) from glass plates polished on all sides measuring 50 mm×50 mm×2 mm after treatment with 5% strength hydrochloric acid for 24 hours at 95° C. [mg/cm$^2$].

TABLE

Compositions (in % by weight, based on oxide) and essential properties of glasses according to the invention.

| Examples: | 1 | 2 | 3 | 4 | 5 | 6 |
|---|---|---|---|---|---|---|
| $SiO_2$ | 61.1 | 63.0 | 65.0 | 65.0 | 65.0 | 62.1 |
| $B_2O_3$ | 2.9 | 2.0 | 1.0 | 1.0 | 1.0 | 4.4 |
| $Al_2O_3$ | 21.0 | 19.0 | 17.0 | 17.0 | 17.7 | 21.9 |
| MgO | 3.5 | 4.5 | 5.5 | 8.0 | 8.0 | 6.0 |
| CaO | 8.0 | 8.0 | 8.0 | 5.5 | 5.5 | 1.1 |
| SrO | 2.0 | 2.0 | 2.0 | 2.0 | 2.0 | 2.9 |
| BaO | 0.5 | 0.5 | 0.5 | 0.5 | 0.5 | 1.0 |
| $ZrO_2$ | 0.2 | 0.2 | 0.2 | 0.2 | — | — |
| $SnO_2$ | 0.3 | 0.3 | 0.3 | 0.3 | 0.3 | 0.5 |
| $TiO_2$ | 0.2 | 0.2 | 0.2 | 0.2 | — | — |
| $CeO_2$ | 0.3 | 0.3 | 0.3 | 0.3 | — | — |
| $\rho$ [g/cm$^3$] | 2.540 | 2.545 | 2.553 | 2.551 | 2.533 | 2.500 |
| $\alpha_{2/300}$ [10$^{-6}$/K] | 3.73 | 3.83 | 3.94 | 3.78 | 3.72 | 3.00 |
| $T_g$ [° C.] | 765 | 762 | 765 | 762 | 772 | 772 |
| T4 [° C.] | 1296 | 1301 | 1295 | 1290 | 1295 | 1311 |
| T13 [° C.] | 775 | 772 | 770 | 771 | 777 | 781 |
| AP [° C.] | 770 | 768 | 767 | 765 | 769 | 776 |
| SP [° C.] | 722 | 720 | 721 | 719 | 722 | 730 |
| UDL [° C.] | ~1300 | 1285 | 1295 | 1300 | ~1300 | n.m. |
| $V_{max}$ [µg/h] | 59 | 34 | 27 | 26 | 24 | n.m. |
| "H" [µg Na$_2$O/g] | 6 | 9 | 10 | 10 | 10 | 5 |
| HCl [mg/cm$^2$] | 0.11 | 0.04 | 0.01 | 0.03 | 0.02 | 0.27 | n.m. = not measured

As the working examples illustrate, the glasses according to the invention have the following advantageous properties:

A thermal expansion $\alpha_{20/300}$ of from $2.8 \cdot 10^{-6}$/K to $4.0 \cdot 10^{-6}$/K, so matched to the expansion behavior of Si (a-, poly- and µc-Si)

With $T_g$ >720° C., a very high glass transition temperature. This is essential for the lowest possible compaction as a result of production and for use of the glasses as substrates in high-temperature deposition processes.

With $\rho$<2600 g/cm$^3$, a low density

A temperature at a viscosity of 10$^4$ dPas of at most 1330° C., which means a process-favorable processing range, and good devitrification stability. These two properties enable the glass to be produced as flat glass by the various drawing methods, for example microsheet down-draw, up-draw or overflow fusion methods, and, in a preferred embodiment, if it is free from $As_2O_3$ and $Sb_2O_3$, also by the float process.

High chemical resistance, evident from the excellent acid resistance, which makes them sufficiently inert to the chemicals used in the production of flat-panel screens.

Furthermore, the glasses have high solarization stability, high transparency and high thermal shock resistance.

The glasses are thus highly suitable for use as substrate glass in display technology, in particular for TFT displays, and in thin-film photovoltaics, in particular based on µc-Si.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An alkali-free aluminoborosilicate glass comprising the following composition in % by weight, based on oxide:

| | |
|---|---|
| $SiO_2$ | 60.5–69 |
| $B_2O_3$ | 0.5–4.5 |
| $Al_2O_3$ | 15–24 |
| MgO | 3–10 |
| CaO | 0–10 |
| SrO | 0.5–8 |
| BaO | 0.5–5.5 |
| with MgO + CaO + SrO + BaO | 8–19 |
| $SnO_2$ | 0.1–2 |
| $ZrO_2$ | 0–2 |
| $TiO_2$ | 0–2 |
| $CeO_2$ | 0–1 |
| ZnO | 0 < 1. |

2. The aluminoborosilicate glass according to claim 1, wherein the glass comprises the following composition in % by weight, based on oxide:

| | |
|---|---|
| $SiO_2$ | 60.5–68 |
| $B_2O_3$ | 0.5–4.5 |
| $Al_2O_3$ | 16–23 |
| MgO | 3–9 |
| CaO | 1–9 |
| SrO | 0.5–7 |
| BaO | 0.5–5.5 |
| with Mgo + CaO + SrO + BaO | 8–18 |
| $SnO_2$ | 0.1–1 |
| $ZrO_2$ | 0–1 |
| $TiO_2$ | 0–1 |
| $CeO_2$ | 0–1 |
| ZnO | 0<1 |

3. The aluminoborosilicate glass according to claim 1, wherein the glass comprises at least 0.1% by weight of $ZrO_2$.

4. The aluminoborosilicate glass according to claim 1, wherein the glass comprises at least 0.1% by weight of $TiO_2$.

5. The aluminoborosilicate glass according to claim 1, wherein the glass comprises at least 0.1% by weight of $CeO_2$.

6. The aluminoborosilicate glass according to claim 1, wherein the glass comprises <4.0% by weight of $B_2O_3$.

7. The aluminoborosilicate glass according to claim 1, wherein the glass comprises the following composition in % by weight, based on oxide:

| | |
|---|---|
| $SiO_2$ | 60.5–66 |
| $B_2O_3$ | 0.5–3.5 |
| $Al_2O_3$ | 16.5–<22.5 |
| MgO | 3–8.5 |
| CaO | 2–8.5 |
| SrO | 1.5–6.5 |
| BaO | 0.5–4.5 |
| with Mgo + CaO + SrO + BaO | 8–18 |
| $SnO_2$ | 0.1–0.7 |
| $ZrO_2$ | 0.1–1 |
| $TiO_2$ | 0.1–0.5 |
| $CeO_2$ | 0.1–0.5 |

8. The aluminoborosilicate glass according to claim 1, wherein the glass comprises <3. 0% by weight of $B_2O_3$.

9. The aluminoborosilicate glass according to claim 1, wherein the glass is produced in a float plant, wherein, apart from unavoidable impurities, the glass is free from arsenic oxide and antimony oxide.

10. The aluminoborosilicate glass according to claim 1, wherein the glass further comprises:

| | |
|---|---|
| $As_2O_3$ | 0–1.5 |
| $Sb_2O_3$ | 0–1.5 |
| Cl | 0–1.5 |
| F | 0–1.5 |
| $SO_4^{2-}$ | 0–1.5 |
| with $As_2O_3 + Sb_2O_3 +$ Cl + F + $SO_4^{2-}$ | $\leq 1.5$ |

11. The aluminoborosilicate glass according to claim 1, having a coefficient of thermal expansion $\alpha_{20/300}$ of $2.8 \cdot 10^{-6}$/K–$4.0 \cdot 10^{-6}$/K, a glass transition temperature $T_g$ of >720° C. and a density $\rho$ of <2.600 g/cm$^3$.

12. A method of making a substrate glass in display technology comprising incorporating the aluminoborosilicate glass according to claim 1.

13. A thin film photovoltaic incorporating the aluminoborosilicate glass according to claim 1.

14. A liquid-crystal display incorporating the aluminoborosilicate glass according to claim 1.

15. A process for making aluminoborosilicate glass, comprising melting in % by weight, based on oxide:

| | |
|---|---|
| $SiO_2$ | 60.5–69 |
| $B_2O_3$ | 0.5–4.5 |
| $Al_2O_3$ | 15–24 |
| MgO | 3–10 |
| CaO | 0–10 |
| SrO | 0.5–8 |
| BaO | 0.5–5.5 |
| with MgO + CaO + SrO + BaO | 8–19 |
| $SnO_2$ | 0.1–2 |
| $ZrO_2$ | 0–2 |
| $TiO_2$ | 0–2 |
| $CeO_2$ | 0–1 |
| ZnO | 0 < 1. |

* * * * *